May 19, 1959 A. S. HARLAN ET AL 2,887,228
LIQUID FILTER DEVICE
Filed May 2, 1956 3 Sheets-Sheet 1

INVENTORS.
AVERY S. HARLAN.
PAUL R. HONAN.
BY
Lockwood, Galt, Woodard & Smith
ATTORNEYS.

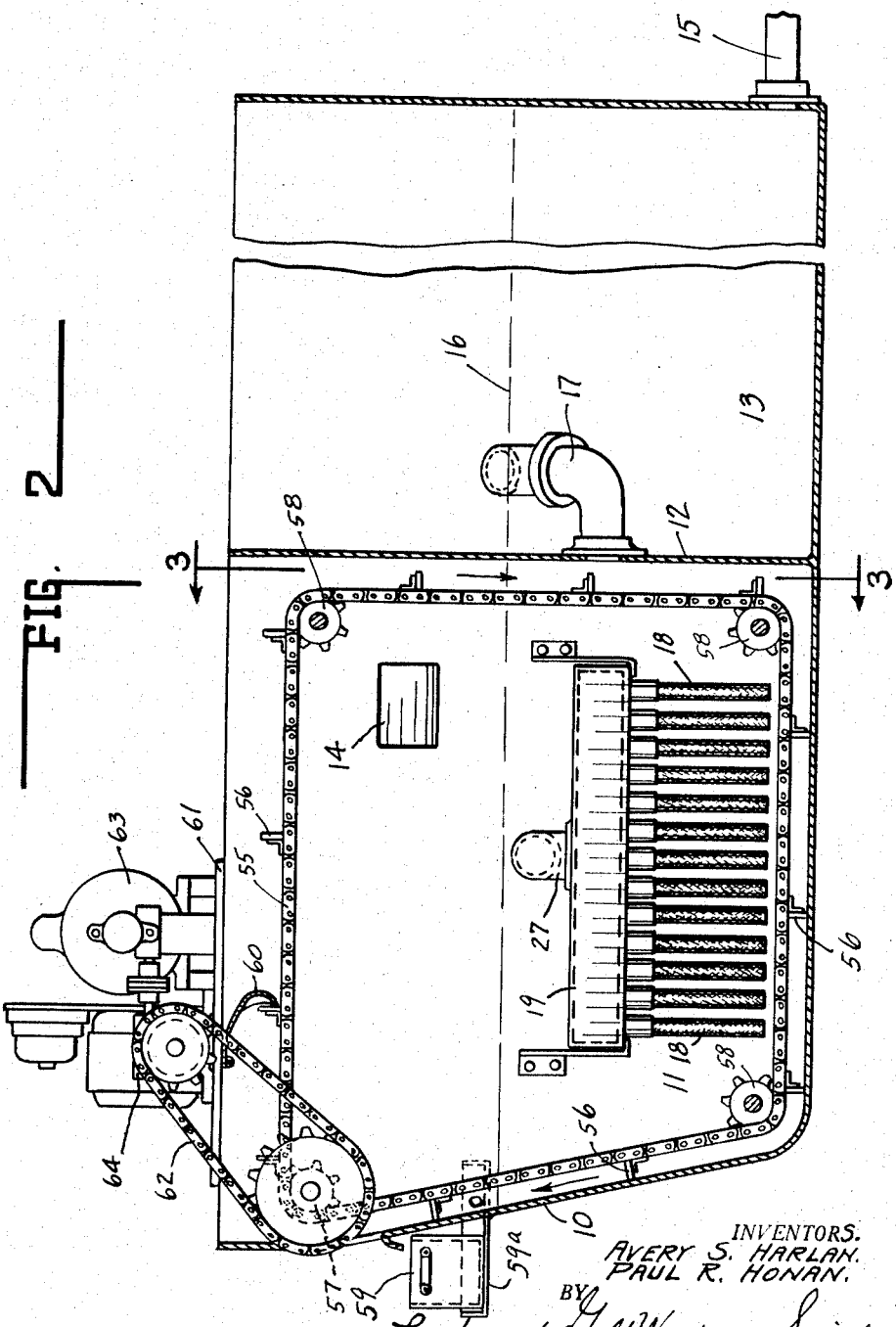

May 19, 1959    A. S. HARLAN ET AL    2,887,228
LIQUID FILTER DEVICE
Filed May 2, 1956    3 Sheets-Sheet 3
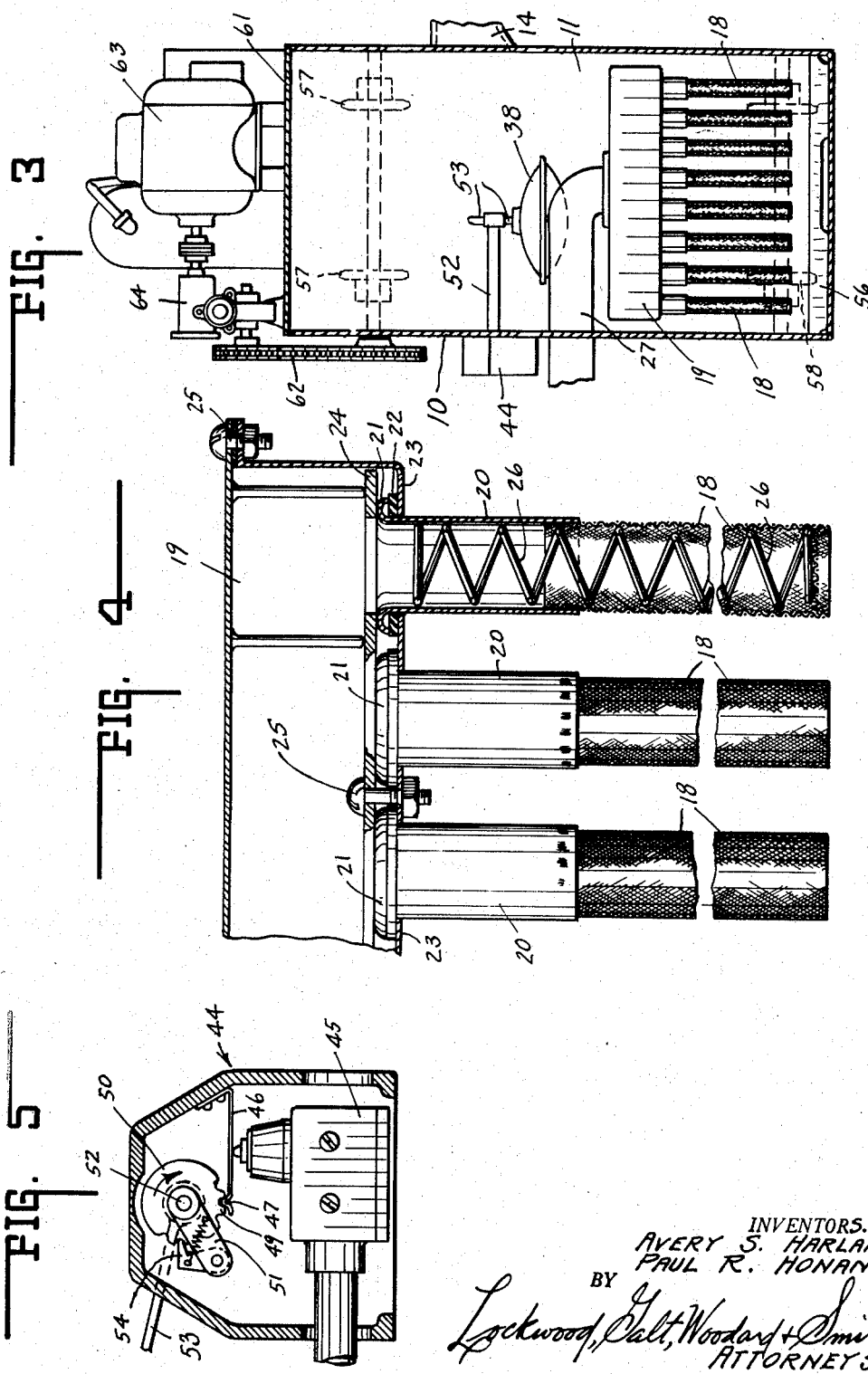
INVENTORS.
AVERY S. HARLAN.
PAUL R. HONAN.
BY
Lockwood, Galt, Woodard + Smith
ATTORNEYS.

United States Patent Office 2,887,228
Patented May 19, 1959

2,887,228

LIQUID FILTER DEVICE

Avery S. Harlan, Indianapolis, and Paul R. Honan, Lebanon, Ind., assignors, by mesne assignments, to Indiana Commercial Filters Corporation, Lebanon, Ind., a corporation of Indiana Application May 2, 1956, Serial No. 582,188

8 Claims. (Cl. 210—108)

This invention relates to a vacuum type filter for filtering and reclaiming liquids such as cooling and cutting lubricants, washing solvents, juices, and wastage such as in paper mills to prevent contamination of outlets, and the like.

It is the purpose of the invention to provide a vacuum-type filter having a maximum filtering area which will be automatically self-cleaning, and whereby the sludge or residue may be readily removed. These characteristics and advantages may be obtained and accomplished by a filtering device as hereinafter more particularly shown and described.

One feature of the invention resides in the provision of a plurality of closely spaced filter tubes, preferably of elongated cylindrical form to provide a maximum filtering area, said tubes being submerged in the liquid to be filtered and having one end connected with a source of partial vacuum for sucking such liquid therefrom so that it is caused to pass into the tubes through a filtering media forming the peripheral wall thereof, whereby the effective area of the filtering media will be greatly in excess of the area of the liquid level of the liquid to be filtered.

Another feature of the invention resides in the provision of a float-controlled valve governed by the liquid level surrounding the filter tubes for actuating a reversing valve in the vacuum line, or otherwise arranged for changing the pressure within the tubes from a negative to a positive pressure. Thus when vacuum is applied to the interior of the tubes, creating a negative pressure therein, the surrounding liquid to be filtered will be drawn through the filtering wall of each tube for discharge therefrom. Upon the liquid level being raised, due to clogging of the filtering media, the pressure within the tubes will be changed from a negative to a positive pressure and liquid forced therethrough to break away and remove the sludge. Upon the sludge being thus removed under liquid pressure so that the cleansing liquid will readily pass therethrough, the surrounding liquid level will again rise and elevate the float which will thereupon reverse the valve to shift the pressure within the tubes from positive to negative, and continue the filtering process.

A further feature of the invention resides in the mechanism operating to shift the pressure within the tubes from negative to positive and back again, by successive elevations of the surrounding liquid level in each instance.

A still further feature of the invention resides in the mechanism for removing sludge from the bottom of the liquid tank in which the filtering tubes extend, and delivering it into a removable container.

A further feature of the invention resides in the circuit-controlled switch for the fluid reversing valve of a character which will cause said valve to be actuated upon successive elevations of the liquid level, for and in the manner hereinafter more particularly described.

Other features of the invention will be made more apparent and be more particularly pointed out in the following specifications and claims.

The full nature of the invention will be understood from the accompanying drawings and the following description and claims:

Fig. 2 is a longitudinal vertical section through the filter device;

Fig. 3 is a section taken on lines 3—3 of Fig. 2;

Fig. 4 is an elevation of a plurality of the filter tubes with the header therefor shown in section and parts broken away;

Fig. 5 is an elevational view of the float-controlled switch actuating mechanism.

Figure 1:
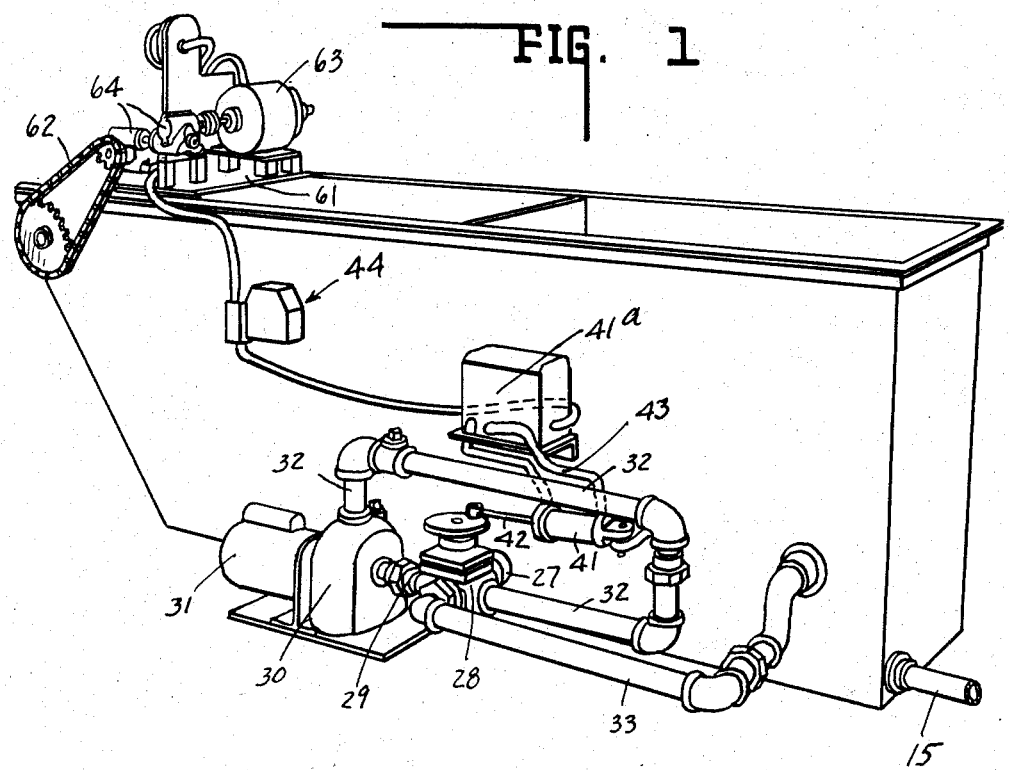
Fig. 1 is a perspective view of the filter device showing the pressure pump and controls for alternately developing a partial vacuum and positive liquid pressure in the filter.
Figure 6:
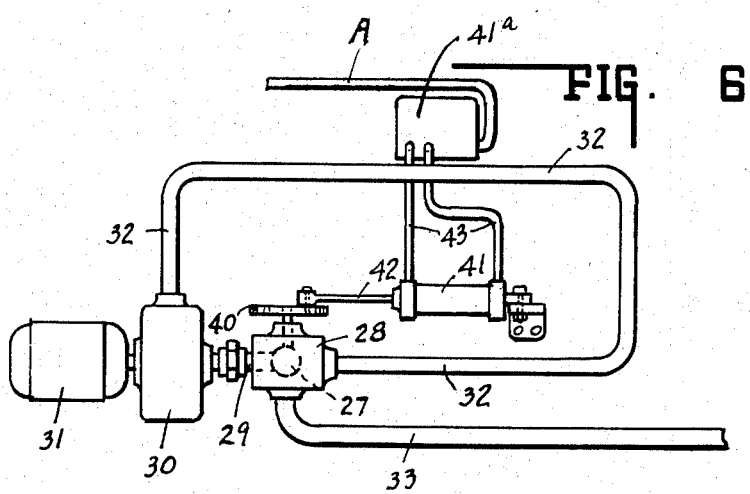
Fig. 6 is a diagrammatical illustration of the pressure system.

In the drawings there is shown a vacuum filter device comprising a tank 10 having a compartment 11 for receiving liquid to be filtered and separated by the partition 12 from a compartment 13 for receiving the filtered liquid. The liquid to be filtered flows into the compartment 11 through the inlet 14 in the side wall thereof. The filtered liquid can be withdrawn in any suitable manner from the compartment 13 through the outlet 15. The liquid level in both compartments is indicated at 16, there being provided a by-pass 17 which permits filtered liquid to flow from the compartment 13 back into the compartment 11 in the event the unfiltered liquid therein may fall below the level 16, it being particularly important that a liquid level be maintained above the filtering media.

The filter comprises a plurality of projecting filter members herein shown as tubes 18 supported by and extending downwardly from a header 19. Said tubes are formed of elongated fine-mesh screen cylinders including an end screen covering the exposed end thereof. Said tubes have their upper ends secured to a thimble 20 terminating in a peripheral flange 21 which seats in sealing relation, through the sealing gasket 22, upon the bottom plate 23 of the header 19. Such sealing of the tube-supporting thimbles is effected by clamping their flanges 21 and sealing gasket 22 between the bottom 23 and a clamping plate 24 by the bolts 25. To retain the screen or filter media of the filter tubes in their tubular shape, a spiral spring 26 is extended therein.

The top of the header 19 is connected through the conduit 27 with a reversing valve 28. The reversing valve, in turn, is connected through the pipe 29 and with the inlet side of a pressure pump 30 driven by the motor 31. The outlet of the pressure pump 30 is connected by the pipe 32 with the other side of the valve 28. The valve 28 is also connected with a pipe 33 leading to the compartment 13 for filtered liquid. This arrangement is such that when the valve is turned to filtering position, it will draw, under partial vacuum, liquid from the unfiltered liquid compartment 11 through the filter tubes into the header 19, through the conduit 27, to the inlet side of the pump to be discharged by the pump through the pipe 32 back through the valve into pipe 33, and thence into the filtered liquid compartment 13. When the valve is reversed, the pump will draw the filtered liquid from the compartment 13 through the pipe 33, and valve 28, pipe 29, to the inlet side of the pump to be discharged under pressure through the pipe 32, valve 28, conduit 27, into the header 19. Such filtered liquid will then be forced into the filter tubes and outwardly of the filtering media for reverse flow cleansing thereof.

The above arrangement is such that during comparatively long periods of filtering, the pump 30 which is continuously driven, produces a negative pressure or partial vacuum in the head 19, sucking the liquid from the compartment 11 through the filter tubes and conduit 27, and forcing it from its discharge side through the pipe 32, valve 28 and pipe 33, into the filtered liquid compartment 13. Since the liquid may be drawn and filtered from the compartment 11 faster than it flows therein from the inlet 14, and to maintain the liquid level above the filter tubes, the by-pass 17 is provided so that, as the liquid level may drop in the compartment 11, a sufficient level of liquid will be maintained by liquid flowing therein through the by-pass 17 from the compartment 13, it being desirable that at all times the tubes and header be filled with liquid.

It is to be understood, however, that in practice the liquid may be continuously circulated as by a circulating pump, from the compartment 13 through a machining operation, or the like, back to the compartment 11. Thus the proper supply of liquid is maintained in said compartments.

When sludge accumulates about the filter tubes so as to retard passage therethrough sufficiently to raise the liquid level in compartment 11, the float 38 therein will be raised and cause the valve 28 to be reversed. Thereupon, the pump 30 will force the filtered liquid from the compartment 13 in the above described reverse flow direction into the header 19 under a sudden pulse of positive pressure. The pulse of liquid and pressure will kick and break off the sludge, occasionally in the form of a caked sleeve, free of the filter tubes so that it will slide downwardly or fall therefrom to the bottom of the tank, freeing and cleansing the filter media. Immediately upon this occurring, there will be a free flow of liquid outwardly from the filter tubes, further raising the liquid level in the tank 11. This secondary elevation of the liquid level will further raise the float to effect reversal of the valve 28 from its back-flow position to its filtering position. Thereupon, the filtering action will be resumed. By reason of the sudden pulse of back-flow liquid the cleansing action will be completed in a few seconds, thereby permitting the filtering operation to continue with only occasional very short interruptions.

To actuate the reversing valve, there may be operatively connected therewith an actuating disc 40 oscillating through an angle of approximately 90°. The oscillation is effected by a reciprocating air pump 41 connected thereto by the connecting rod 42. The air pump 41 is actuated by air pressure through the pipes 43, leading from a valve 41a connected with any suitable source of air pressure through line A.

Valve 41a may be of the magnetic type actuated by a circuit controlled by a float-controlled device generally indicated at 44. Said device includes the micro-switch 45 in a circuit 45a leading to said valve. The micro-switch closes the circuit to open the valve when its plunger is pressed down by a spring arm 46 secured to one end of the housing of said device. The free end of the spring arm 46 is crimped to provide a projection 47 adapted to extend into the space between the teeth 49 of a toothed wheel 50. Said wheel is mounted for free rotation within the housing in position to receive said projection between its teeth. A ratchet arm 51 is secured to a shaft 52 extending through the wheel and about which it rotates, said shaft being secured outside of said housing to the rod 53 carrying float 38. The free end of the ratchet arm mounts a ratchet 54 biased into ratcheting engagement with the teeth of the toothed wheel.

This arrangement is such that upon the float being raised, the wheel 50 will be ratcheted in the direction of the arrow. As the float lowers, the ratchet will ride free by reason of the wheel being locked against reverse movement by the spring arm 46.

Thus, on the float rising and ratcheting the wheel in the direction of the arrow, the end 47 of the spring arm will ride over the next tooth, forcing it downwardly to depress the micro-switch and close the circuit 45a to the valve 41a which in turn acts to shift the reversing valve 28 to backwash position to effect a cleaning cycle. The spring arm 46 having thereby pulsed the circuit, its end drops back into the space between the next adjacent pair of teeth on wheel 50 upon the float being further raised when the cleansing action is completed. This occurs when the filter tubes are cleaned to permit free back flow which will raise the liquid level and the float 38 to again actuate the micro-switch to pulse the control valve 41a in the manner above described. Thereupon, valve 28 will be returned to its original position for the filtering cycle.

Upon completion of the filter cleaning cycle, the sludge will have been discharged from about the tubes, dropping down upon the bottom of the tank. For removing the sludge therefrom, there is provided a pair of endless chains 55 carrying a series of scrapers 56. Said chains pass about a set of sprocket wheels, there being provided a pair of driving sprocket wheels 57 and the idler wheels 58. Said wheels are so located as to cause the chains 55 to travel in the direction of the arrow with the scraper blades scraping the sludge along the bottom of the tank and up a sloping end wall until they reach the upper edge of said end wall and dump the sludge into a perforated receptacle 59 removably mounted upon the drip pan 60 which will discharge drippings into the compartment 11.

The scraper chains 55 are driven through sprockets 57 which in turn are driven by a chain or belt 62, driven by the motor 63 mounted on the platform 61 through suitable reduction gearing as indicated at 64.

It will, therefore, be observed that the filtering action is substantially continuous over an exceedingly large area of filtering media, being interrupted for automatic self cleansing only for very short intervals not exceeding a matter of seconds, the sludge being gathered for convenient removal.

The filtered liquid compartment indicated at 13 may be contained in the same tank separated merely by a partition from the compartment 11 in which the filtering action takes place, or may be located in a separate tank at a distance from the filtering compartment connected therewith through suitable conduits. Thus there may not be only provided a separate tank for the filtered liquid arranged at a convenient location, but such tank may be connected with a plurality or battery of filtering tanks.

Whereas the filtering tubes are herein shown depending from the header to extend downwardly, their arrangement may be reversed so that they extend upwardly with the header below. One or more filtering tubes may be employed depending upon the desired capacity, and the reference herein to a header for said tubes may encompass a plurality of conduits leading from the respective tubes to the reversing valve or any suitable source of controlled partial vacuum and a pressure exerting medium.

As above pointed out, various arrangements and applications of the invention may be employed for filtering by vacuum with automatic reverse flow cleansing wherein it is desired to separate solids from a liquid either for re-use or circulation as in lubricating and cooling liquids involving abrasives or detergents; or for clarification as in fruit or vegetable juices, liquid polishing or cleaning material; or for disposal of waste material such as discharged from processing operations as in paper-making plants and the like.

The invention claimed is:

1. A liquid filter comprising a tank including a compartment for receiving liquid to be filtered, a plurality of filter tubes each having a cylindrical wall of filter media closed at one end, a header communicating with the other ends of said tubes, said header and tubes being mounted in said compartment, an inlet through which liquid to be filtered is introduced into said compartment, a compartment for receiving filtered liquid, a power-driven fluid pump, a reversing valve movable to one position to provide a fluid passage between said header and the intake side of said pump for discharge to said filtered liquid compartment and to a second position to provide a fluid passage from said filtered liquid compartment to the intake of said pump for passage to said header, and means controlled by elevation of liquid level in said first compartment operatively connected with said valve for alternately moving it from one to the other of said positions.

2. A liquid filter comprising a tank including a compartment for receiving liquid to be filtered, a plurality of filter tubes, each having a cylindrical wall of filter media closed at one end, a header communicating with the other ends of said tubes, said header and tubes being mounted in said compartment, an inlet through which liquid to be filtered is introduced into said compartment, and means for alternately applying a negative pressure in said header to draw liquid into said tubes and a positive pressure therein for forcing liquid outwardly from said tubes, and a float in said compartment controlled by the liquid level therein operably connected with said means to cause said negative and positive pressures to be alternately applied for successive filtering and cleansing cycles upon successive elevations of the liquid level.

3. A liquid filter comprising a tank including a filtering compartment for receiving liquid to be filtered, a plurality of filter tubes each having a cylindrical wall of filter media closed at one end, a header communicating with the other ends of said tubes, said header and tubes being mounted in said compartment, an inlet through which liquid to be filtered is introduced into said compartment, a compartment for receiving filtered liquid, a power-driven fluid pump, a reversing valve movable to one position to provide a fluid passage between said header and the intake side of said pump for discharge to said filtered liquid compartment and to a second position to provide a fluid passage from said filtered liquid compartment to the intake of said pump for passage to said header, a float controlled by the liquid level in said filtering compartment, and means actuated by said float operatively connected with said reversing valve to move said valve to said one position upon elevation of liquid level and move it to said second position upon a further elevation thereof.

4. A liquid filter comprising a tank including a compartment for receiving liquid to be filtered, a filter tube mounted in said compartment having a cylindrical wall of filter media closed at one end, an inlet through which liquid to be filtered is introduced into said compartment, means for alternately applying a negative pressure to the other end of said tube to draw liquid therein through said filter media and a positive pressure therein for forcing liquid outwardly of said tube through said filter media, and a float in said compartment controlled by the liquid level therein operably connected with said means to cause said negative and positive pressures in said tube to be alternately applied for successive filtering and cleansing cycles upon successive elevations of the liquid level.

5. A liquid filter comprising a tank including a filtering compartment for receiving liquid to be filtered, a plurality of filter tubes each having a cylindrical wall of filter media closed at one end, a header communicating with the other ends of said tubes, said header and tubes being mounted in said compartment, an inlet through which liquid to be filtered is introduced into said compartment, a compartment for receiving filtered liquid, a power-driven fluid pump, a reversing valve movable to one position to provide a fluid passage between said header and the intake side of said pump for discharge to said filtered liquid compartment and to a second position to provide a fluid passage from said filtered liquid compartment to the intake of said pump for passage to said header, electrically controlled means for shifting said reversing valve between said positions including an electric circuit, a switch operable to close said circuit, a spring arm depressible to actuate said switch biased to inactive position, a toothed wheel associated with said arm to depress it upon passage of each tooth thereover, a ratchet for ratcheting said wheel in one direction and a float connected with said ratchet controlled by the liquid level in said filtering compartment for ratcheting said wheel to actuate said switch and reverse said valve upon elevation of said liquid level.

6. A liquid filter comprising a tank including a compartment for receiving liquid to be filtered, a plurality of projecting filter members each having a wall of filter media, a header communicating with the interior of said members, said header and members being mounted in said compartment, an inlet through which liquid to be filtered is introduced into said compartment, a compartment for receiving filtered liquid, a power driven fluid pump, a reversing valve movable to one position to provide a fluid passage between said header and the intake side of said pump for discharge to said filtered liquid compartment and to a second position to provide a fluid passage from said filtered liquid compartment to the intake of said pump for passage to said header, and means controlled by the elevation of liquid level in said first compartment operatively connected with said valve for alternately moving it from one to the other of said positions.

7. A liquid filter comprising a tank including a compartment for receiving liquid to be filtered, a plurality of projecting filter members each having a wall of filter media, a header communicating with the interior of said members, said header and members being mounted in said compartment, an inlet through which liquid to be filtered is introduced into said compartment, a compartment for receiving filtered liquid, a power driven fluid pump, a reversing valve movable to one position to provide a fluid passage between said header and the intake side of said pump for discharge to said filtered liquid compartment and to a second position to provide a fluid passage from said filtered liquid compartment to the intake of said pump for passage to said header, and means controlled by the elevation of liquid level in one of said compartments operatively connected with said valve for alternately moving it from one to the other of said positions.

8. A liquid filter comprising a tank including a compartment for receiving liquid to be filtered, a plurality of projecting filter members each having a wall of filter media, a header communicating with the interior of said members, said header and members being mounted in said compartment, an inlet through which liquid to be filtered is introduced into said compartment, a compartment for receiving filtered liquid, a power driven fluid pump, a valve movable into a position for providing a fluid passage from said filtered liquid compartment to the intake of said pump for passage of filtered liquid to said header, and means controlled by the elevation of liquid level in one of said compartments operatively connected with said valve for moving it to said position.

References Cited in the file of this patent

UNITED STATES PATENTS

| | | |
|---|---|---|
| 1,724,436 | Sweetland | Aug. 13, 1929 |
| 1,833,390 | Carter | Nov. 24, 1931 |
| 2,221,210 | Soderquist | Nov. 12, 1940 |
| 2,376,912 | Green | May 29, 1945 |
| 2,454,341 | Repka | Nov. 23, 1948 |
| 2,494,534 | Armstrong et al. | Jan. 17, 1950 |
| 2,511,271 | Kaminky et al. | June 13, 1950 |
| 2,568,085 | Naugle | Sept. 18, 1951 |